United States Patent
Gonzales et al.

[19]

[11] Patent Number: 5,803,389
[45] Date of Patent: Sep. 8, 1998

[54] TAKE-UP REEL FOR MAGNETIC TAPE DATA SYSTEMS

[75] Inventors: Curtis Paul Gonzales; Jeffrey S. McAllister, both of Boise, Id.

[73] Assignee: Hewlett-Packard Company, Palo Alto, Calif.

[21] Appl. No.: 919,691

[22] Filed: Aug. 27, 1997

[51] Int. Cl.[6] ........................................ G03B 1/58
[52] U.S. Cl. .................... 242/348.1; 242/332.4; 242/332.8; 242/613; 242/614
[58] Field of Search ............... 242/332.4, 332.7, 242/332.8, 348.1, 613, 614, 579, 582

[56] References Cited

U.S. PATENT DOCUMENTS

| | | | |
|---|---|---|---|
| 3,006,650 | 10/1961 | Ellmore | 242/332 |
| 3,664,607 | 5/1972 | Trefzger et al. | 242/332.4 |
| 5,431,356 | 7/1995 | Horstman et al. | 242/348.2 |
| 5,443,220 | 8/1995 | Hoge et al. | 242/332.8 |

*Primary Examiner*—John P. Darling

[57] ABSTRACT

A recording tape take-up reel assembly, comprising an annular hub having a top, a bottom, an axis of rotation and a radial surface, a first and second sub flange concentric with the annular hub, each sub flange having a top surface, a bottom surface and an outside circumferential edge surface, wherein the edge surface is adapted to have a tape wound thereon, and wherein the bottom surface of the first sub flange is concentrically attached to the top surface of the hub and the top surface of the second sub flange is concentrically attached to the bottom surface of the hub; and a first and second main flange concentric with the annular hub and the sub flanges, each main flange having a top surface and a bottom surface, wherein the bottom surface of the first main flange is concentrically attached to the top surface of the first sub flange and the top surface of the second main flange is concentrically attached to the bottom surface of the second sub flange.

4 Claims, 4 Drawing Sheets

TAKE-UP REEL FOR MAGNETIC TAPE DATA SYSTEMS

FIELD OF THE INVENTION

This invention relates to magnetic tape drives in general, and in particular to a take-up reel for use with a single reel recording tape cartridge that includes a leader block attached to the recording tape.

BACKGROUND OF THE INVENTION

A widely used medium for storing data is recording tape, which is typically a polymer tape with a magnetic coating. One of the most popular formats of use for the storage of data on tape is tape cartridges. Tape cartridges are generally smaller, simpler and less expensive than reel-to-reel tape systems.

Two widely used formats of tape cartridges are the two-reel cartridge, which is typically in a quarter-inch tape format, and the single, supply-reel cartridge, generally a half-inch tape format cartridge. By enclosing the tape within a housing or cartridge, the tape, and therefore the data stored on the tape are better protected from damage than the more exposed reel-to-reel systems of tape data storage.

The single, supply-reel or half-inch cartridge is able to store much more data than the quarter inch cartridge. Typically, the free end of the tape in the cartridge is attached to a leader block. The leader block is fashioned to act as a barrier or door when the cartridge is not in use, and thereby substantially close off the cartridge from potential sources of harm such as dust, particulate matter contamination and other forms of environmental stress or damage. When the cartridge is in use, the leader block allows the tape to be withdrawn from the cartridge into the tape drive for data recording or retrieval. The take-up reel or spool is built into the tape drive along with an automatic tape threading mechanism.

The recording of data onto the tape is generally referred to as "writing" to the tape and the retrieval of information already written or stored on the tape is referred to as "reading" from the tape. The part of the tape system responsible for these activities is generally referred to as the read/write head. The tape drive that performs the read/write operations is also referred to as a tape "transport."

Typically, the standard tape transport or drive accepts the tape cartridge into an elevator assembly. A threading mechanism grabs the leader block and pulls it free from the cartridge. The leader block is then used to thread the tape through a path which includes a series of guide posts, across the longitudinal read/write head, and into a slot in the take-up reel. Once threaded, the tape from the cartridge can be driven across the read/write head(s) for data transfer operations and wound onto the take-up reel.

The take-up reel is typically configured with a slot in one surface that allows the insertion of the leader block into the hub of the take-up reel in a manner that, ideally, allows the tape to wind smoothly onto the take-up reel. The leader block is captured by a threading pin attached to a threading or threader arm assembly. The threading arm then pulls the leader block in a counter-clockwise direction through the tape path and inserts the leader block into the hub of the take-up reel. During winding on of the tape onto the take-up reel, the leader block spins around the threading pin, as the pin and the take-up reel have the same axis of rotation in this configuration. When the leader block is fully inserted into the take-up reel, the leader block forms a part of the outer circumference of the take-up reel and thus, the magnetic tape winding surface. The leader block and take-up reel are fabricated with a degree of precision so that when the leader block is inserted into the slot in the take-up reel, the slot is closed by the end of the leader block so that a relatively smooth surface is created on the hub of the take-up reel for winding the tape on the hub.

Ideally, the leader block covers the opening to the slot such that a perfectly smooth surface without irregularities is created from the interfitted combination of the leader block and the hub of the take-up reel. Unfortunately, however, such a perfectly smooth interface is not easily achievable nor practical to manufacture. Any misalignment of the magnetic tape to the leader block or a failure to properly seat the leader block in the take-up reel results in a nonuniform tape winding surface which causes undesirable irregularities in the magnetic tape as it is wrapped on the take-up reel. Therefore, small misalignments between the inserted leader block and the hub are commonplace and problematical. Such misalignments can garble data and operations, causing errors in either or both the writing of data to the tape and reading of data from the tape.

Improvements in the functioning of the tape storage and retrieval system are constantly sought to decrease sources of error and failure in data storage and retrieval. Whenever data is transmitted and wherever it is stored, it is vulnerable to many different forces and conditions that can physically distort the record, changing the character of the data. Any source of error, is problematical to the accurate and successful recording and retrieval of data to and from the tape. Irretrievable data can be catastrophic at worst and is always undesirable. The consequences can be devastating; for example, as little as a single wrong bit can change the meaning of an entire sequence of bits, perhaps throwing off a complex mathematical calculation or causing a computer to misinterpret a command. The sources of risk for error and failure are under constant scrutiny for reduction and elimination in the industry. A combination of strategies may be best to safeguard the data from the inevitable assault of errors.

An example of efforts and implementations to the functioning of tape storage and retrieval systems include the leader block and take-up reel of U.S. Pat. No. 5,443,220, wherein the take-up reel and leader block have been configured to ensure that no portion of the leader block extends outside of the slot in the take-up reel. Another example of modifications to reduce errors from tape winding is U.S. Pat. No. 5,431,356 wherein the take-up reel and leader block are modified so that the take-up reel has a radial shape substantially the same as the shape of the radial slot in the take-up.

There is still a demand and need for methods and apparatus to reduce the possible sources of error in tape recording systems.

SUMMARY OF THE INVENTION

The invention comprises, in general terms, a recording tape take-up reel assembly, having an annular hub having a top, a bottom, an axis of rotation and a radial surface; a first and second sub flange concentric with the annular hub, each sub flange having a top surface, a bottom surface and an outside circumferential edge surface, said edge surface adapted to have a tape wound thereon, and wherein the bottom surface of the first sub flange is concentrically attached to the top surface of the hub and the top surface of the second sub flange is concentrically attached to the bottom surface of the hub; and a first and second main flange concentric with the annular hub and the sub flanges, each main flange having a top surface and a bottom surface, wherein the bottom surface of the first main flange is concentrically attached to the top surface of the first sub flange and the top surface of the second main flange is concentrically attached to the bottom surface of the second sub flange.

Additional advantages and novel features of the invention will be set forth in part in the description that follows, and in part will become apparent to those skilled in the art upon examination of the following or may be learned by practice of the invention. The advantages of the invention may be realized and attained by means of the instrumentalities and combinations particularly pointed out in the appended claims.

DETAILED DESCRIPTION OF THE INVENTION

Figure 1:
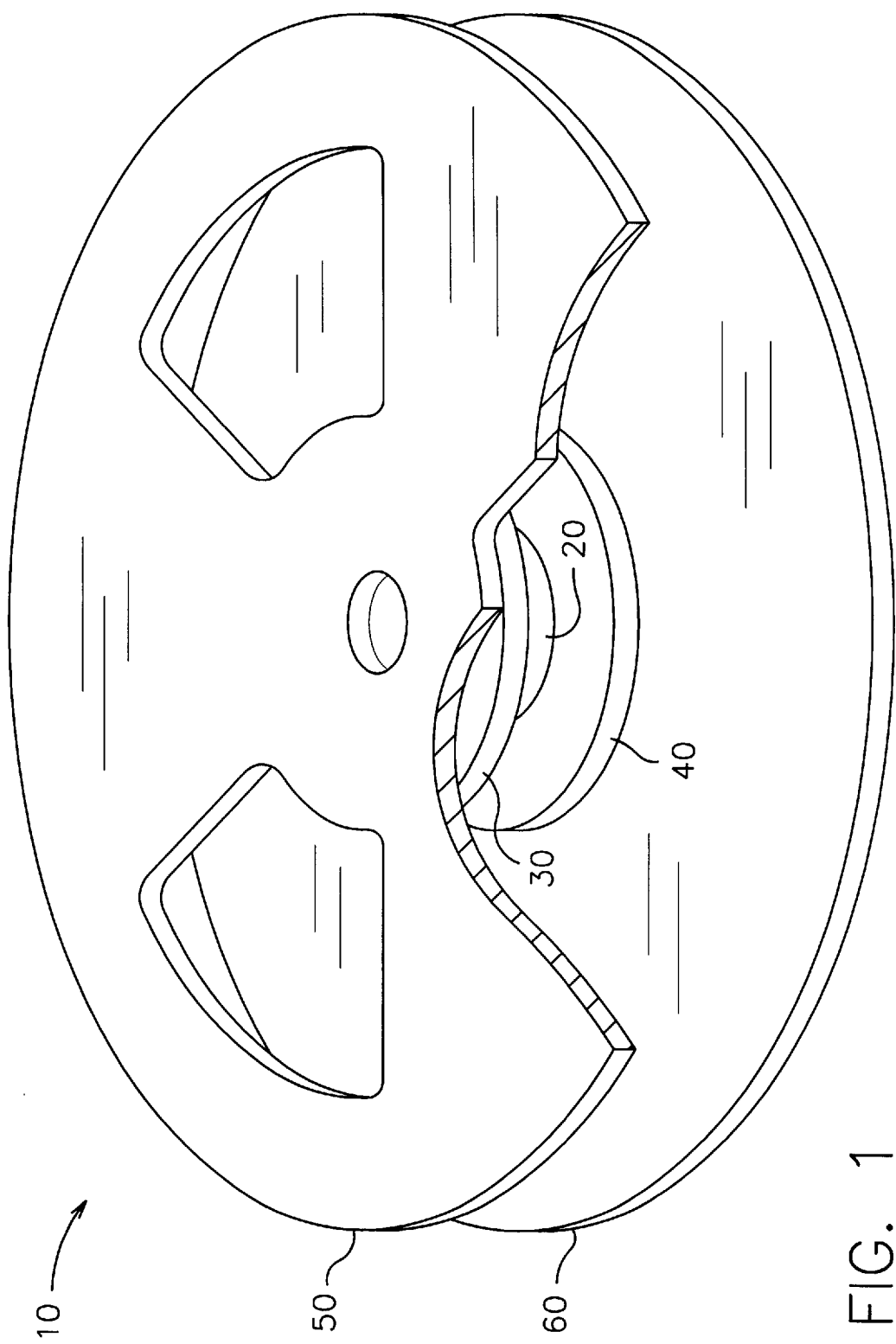
FIG. 1 illustrates an exemplary embodiment of the present invention.

Referring to FIGS. 1–6, an exemplary embodiment of the present invention is described herein. Take-up reel 10 comprises an annular hub 20 having a radial, tape winding surface, and a top 20T, and a bottom 20B. Hub top 20T and hub bottom 20B are affixed to first and second subplate 30 and 40. Additionally, attached to the outside surfaces of first and second subplates 30 and 40, are first and second main plates 50 and 60.

First subplate or subflange 30 is substantially disk-shaped and has a top surface 30T, a bottom surface 30B and an outside marginal or circumferential edge 30E. First subplate 30 is attached to hub 20 concentrically with bottom surface 30B of subplate 30 being attached to top surface 20T of hub 20. Second subplate 40 is of like dimension, having a top surface 40T, bottom surface 40B and outside marginal or circumferential edge 40E. Subplate 40 is also attached to hub 20 in an analogous relationship to that of first subplate 30 and hub 20, with the distinction that top surface 40T of subplate 40 is attached to bottom surface 20B of hub 20.

Figure 2:
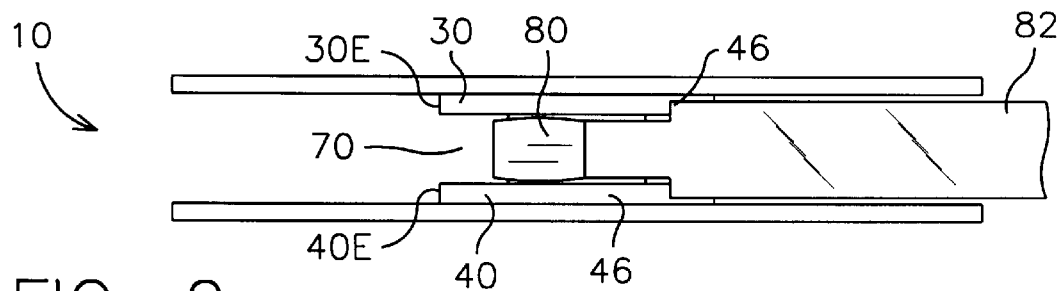
FIG. 2 shows a side view of the embodiment of FIG. 1, showing the tape winding on to the outside surface of the stepped reel.
Figure 3:
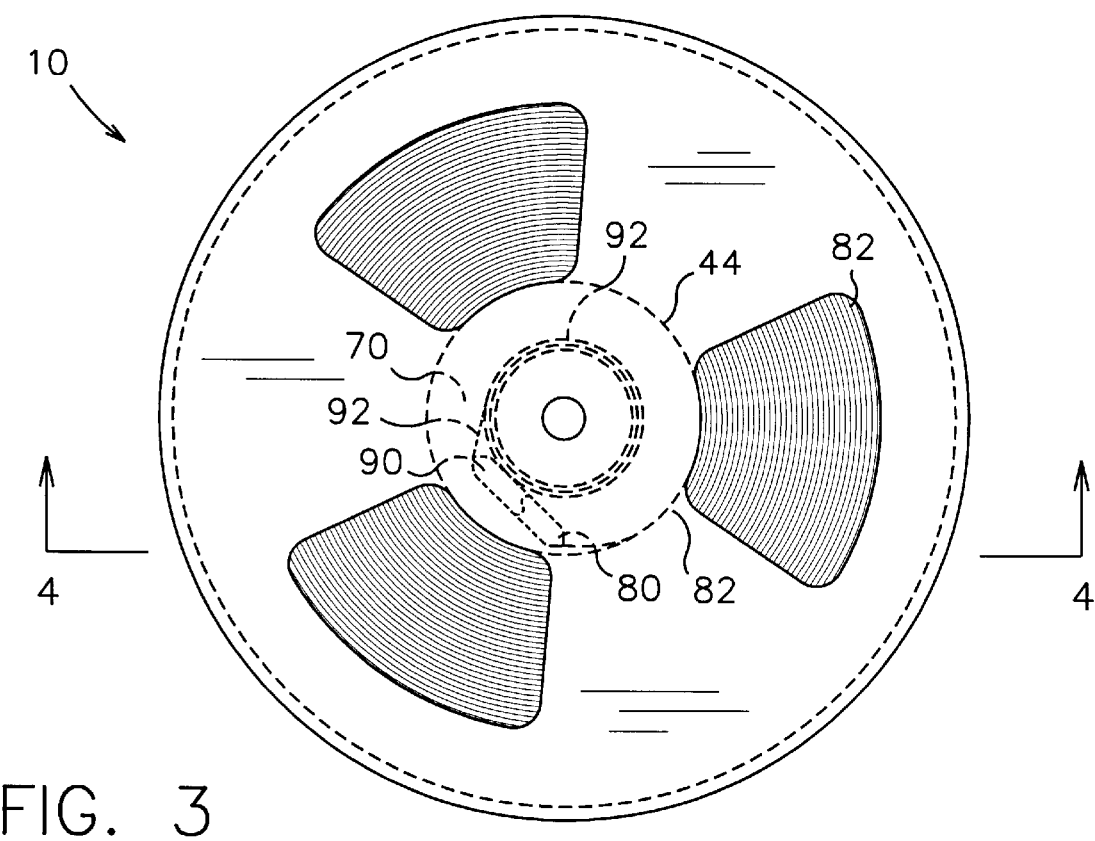
FIG. 3 is a top view of the embodiment shown in FIG. 1, showing the invention in use.
Figure 4:
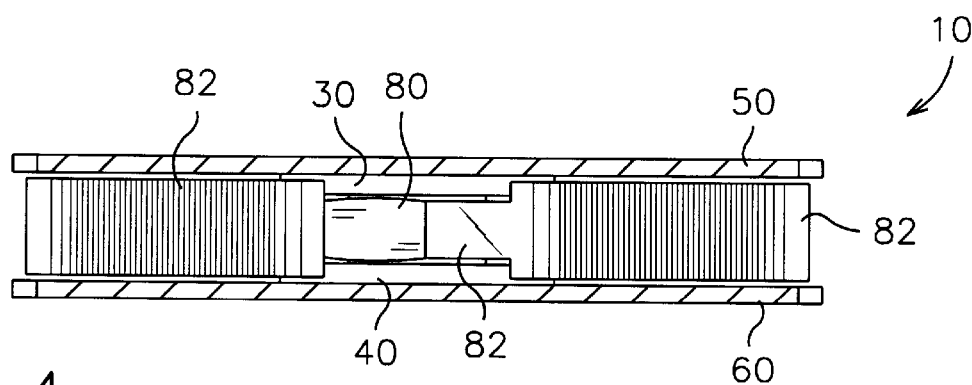
FIG. 4 is a cross section view of FIG. 3, taken along line 4.

The subplates are spaced apart so that first and second edge surfaces 30E and 40E act as stepped, winding rims and together form a data tape-winding surface 46, as best seen in FIG. 2. Further, each disk has an inner diameter 32, and 42, and outer diameter 34 and 44, respectively, and their spaced relationship with hub 20 creates a receptacle or space 70, to house a leader block 80.

First and second mainplate or mainflange 50 and 60 are substantially disk shaped and have a top surface 50T and 60T, and a bottom surface 50B and 60B, respectively. Bottom surface 50B of first mainplate 50 is fixedly and concentrically attached to top surface 30T of first subplate 30. Analogously, top surface 60T of second mainplate 60 is fixedly and concentrically attached to bottom surface 40B of second subflange 40.

Main plates 50 and 60 are dimensioned to each have a larger diameter than subflanges 30 and 40. The diameter of each mainplate is further of a diameter to fit appropriately in a selected tape drive. In the case of a half-inch cartridge that dimension would be approximately 3.25 inches. Mainplates 50 and 60 function as storage guide rims, providing the surfaces on which the multiple wraps of data tape 82 can be stored.

Figure 5:
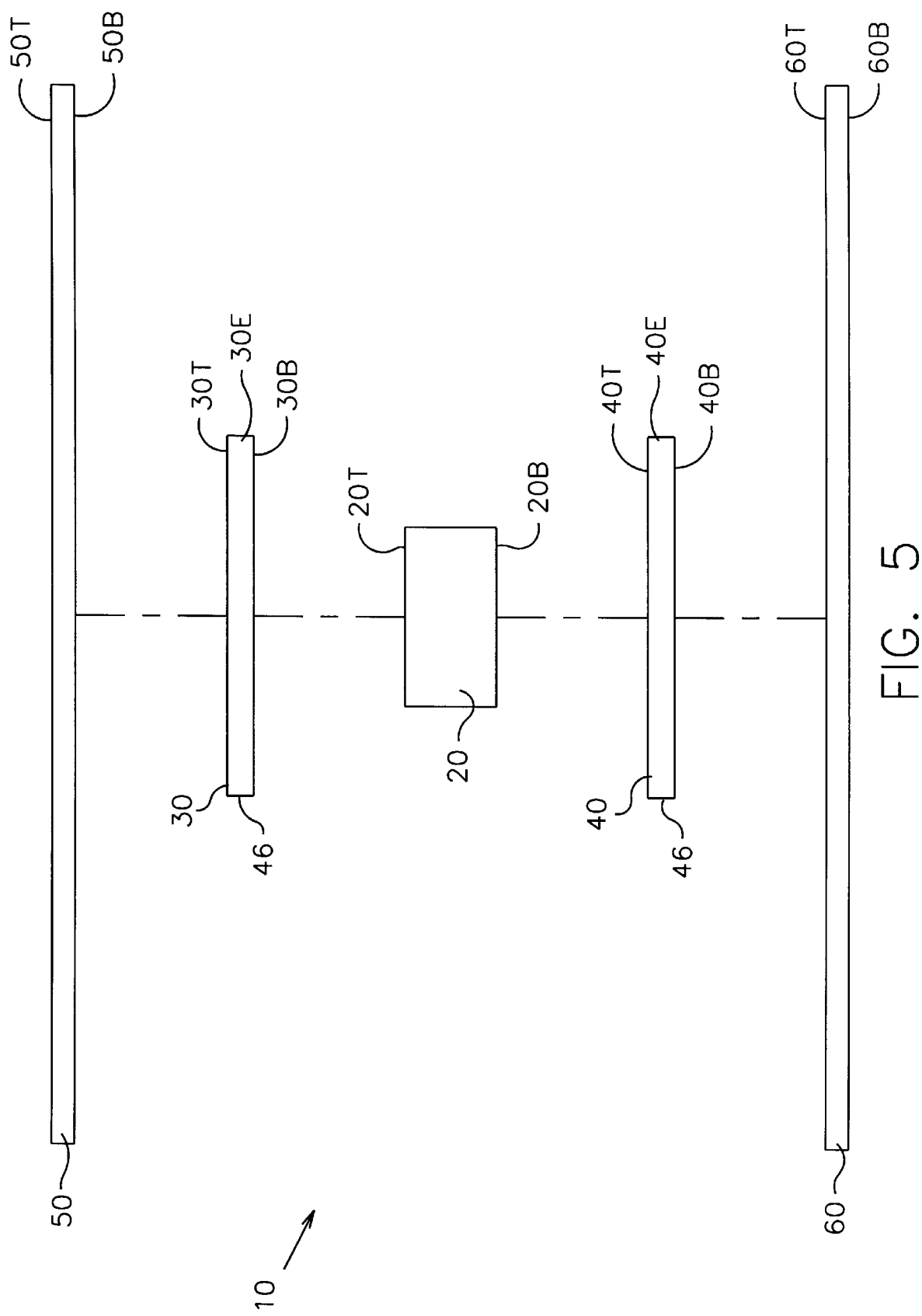
FIG. 5 is an exploded side view of the embodiment shown in FIG. 1.
Figure 6:
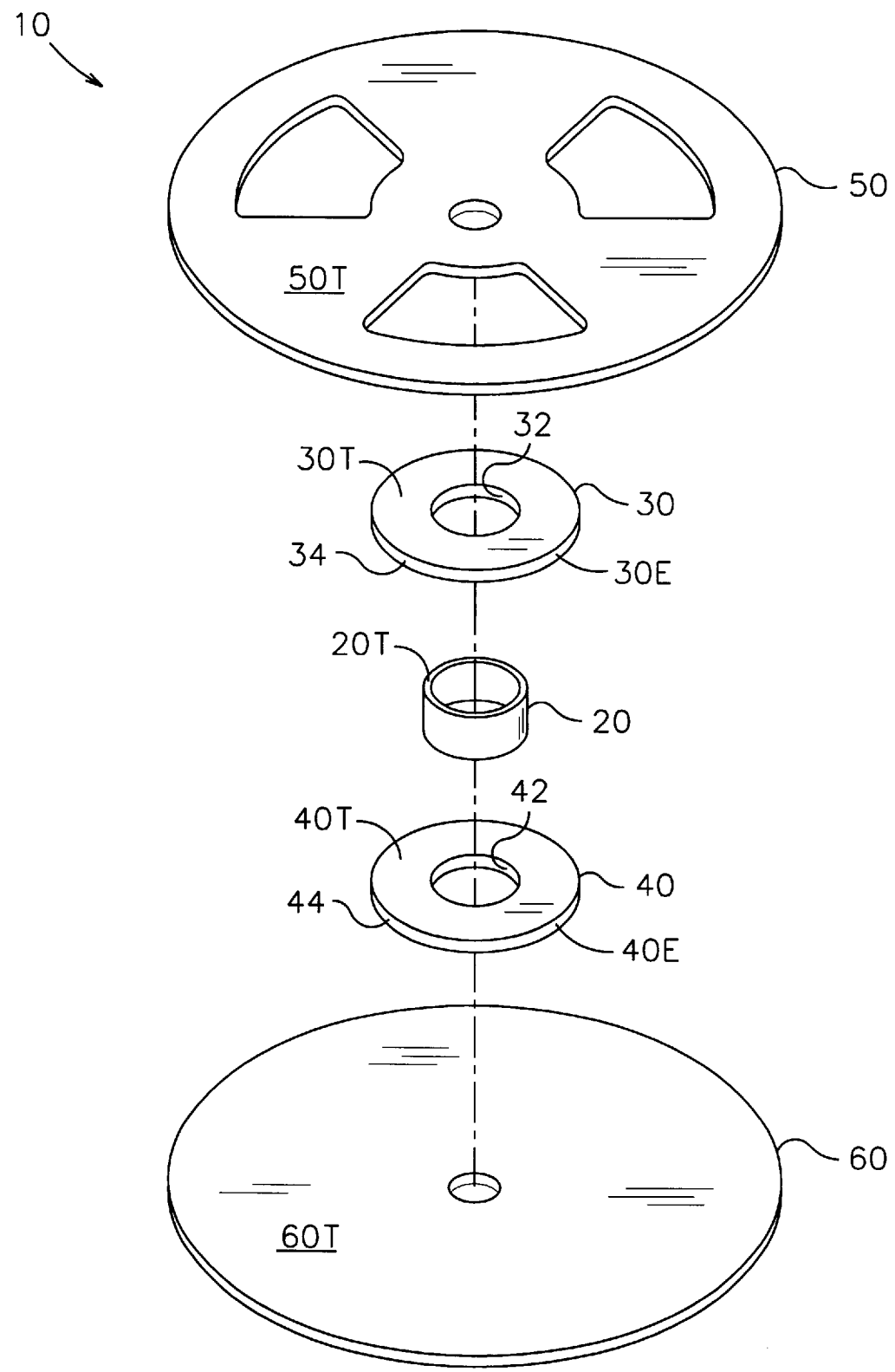
FIG. 6 is an exploded isometric view of the embodiment shown in FIG. 1.

FIG. 5 shows an exploded view of an exemplary embodiment of the invention. Take-up reel 10 can be manufactured in any suitable manner. Take-up reel may be manufactured as separate components and assembled; manufactured as an integral unit; or with groups of subunits being integral and then assembled.

In this example leader block 80, originates in an inactive position in a cartridge (not shown). Leader block 80 is further attached to one end of a length of data tape 82. Leader block 80 is configured here so that it can attach to a take-up block 90. Take-up block 90 has a first or block-connecting edge and a second, or tape-attached edge. The second edge is captively attached to one end of a piece of thread-guide tape 92. The other end of guide tape 92 is fixedly attached to hub 20 and is of a width to fit in leader block space 70 and wind around hub 20. The first edge of take-up block 90 is dimensioned to couple with leader block 80 in a captured, but disengageable fashion, that will allow it to pull leader block 80 appropriately through a tape drive, as is described in more detail below.

The use of the invention, as described in this illustrative embodiment, includes the steps and structures necessary for understanding and explaining the invention and it's use. Other typical steps and structures that are normally related to the use of the invention and well known to one skilled in the art, but that are not essential to the understanding of the present invention, are not described in detail herein, to avoid confusion.

In use, a tape cartridge, as is well known in the art, would be inserted into a tape drive (not shown) and take-up block 90 would couple with leader block 80, in a captured fashion. After the coupling, leader block 80 would then be pulled from the tape cartridge, along with attached data tape 82, through an appropriate path to thread data tape 82 for read/write operations. As take-up reel 10 begins to wind tape onto itself, guide tape 92 will be wound onto hub 20, pulling the coupled take-up block 90 and leader block 80 into receptacle 70. As a consequence of the winding of guide tape 92 around hub 20, leader block 80 is securely restrained in receptacle or space 70. Leader block 80 should be dimensioned to span no further than from the inner diameter to the outer diameter of first and second subplate 30 and 40, such that leader block 80 will be fully resident in receptacle 70 and attached data tape 82 will wind appropriately onto tape-winding surface 46. As take-up reel 10 continues rotating in the same winding-on direction, data tape 82 is then wound smoothly onto data tape winding surface 46, which, as described above, is composed of first subplate circumferential edge 30E and second subplate circumferential edge 40E. As more and more wraps of data tape 82 continue to wrap on top of each other, the storage space between main plates 50 and 60 will become filled with tape.

In the reverse operation, where the tape is unwound from take-up reel 10, and wound back onto the supply reel 4, in cartridge 1, essentially the same sequence of events happens, but in reverse order. That is to say, data tape 82 simultaneously unwinds from take-up reel 10 and winds onto the supply reel of the tape cartridge, traveling the opposite direction through the tape threading path. When all of the data tape is wound onto the cartridge supply reel, then leader block 80 will be again located in the tape cartridge in the initial position from whence this description started. Take-up block 90 is disengaged from leader block 80 and the cartridge may be removed from the tape drive or transport (not shown).

The invention has been described in the environment of a take-up reel in a cartridge and further including a thread-guide tape 92 and take-up block 90. This environment was chosen for illustration purposes only, to further the understanding of the invention. It will be apparent to one skilled in the relevant art that the invention has application to any take-up reel assembly, particularly in combination with a leader block assembly. It is, however, contemplated that this invention can be used with a wide variety of threading and/or tape supply mechanisms. For example the invention can be used in a two-reel cassette or a reel-to-reel tape system. The invention can be used with a variety of threading arm and threading pin combinations delivering a leader block into receptacle 70. Likewise it is contemplated that one skilled in the art would recognize that leader block 80 can be appropriately delivered and secured within receptacle 70 by a variety of means.

It will therefore be understood that modifications and variations are possible without departing from the scope of the invention as expressed in the following claims.

What is claimed is:

1. A recording tape take-up reel assembly, comprising:

an annular hub having a top, a bottom, an axis of rotation and a radial surface;

a first and second sub flange concentric with the annular hub, each sub flange having a top surface, a bottom surface and an outside circumferential edge surface, said edge surface adapted to have a tape wound thereon, and wherein the bottom surface of the first sub flange is concentrically attached to the top surface of the hub and the top surface of the second sub flange is concentrically attached to the bottom surface of the hub, wherein the hub and sub flanges are oriented and connected to form a leader block receptacle space; and a first and second main flange concentric with the annular hub and the sub flanges, each main flange having a top surface and a bottom surface, wherein the bottom surface of the first main flange is concentrically attached to the top surface of the first sub flange and the top surface of the second main flange is concentrically attached to the bottom surface of the second sub flange.

2. The take-up reel of claim 1 further comprising a leader block assembly configured for attachment to a free end of a length of tape in a tape cartridge said leader block having a shape sized to fit in the receptacle and having a first end adapted for coupling with an engagement means and a second end adapted for attachment to the free end of tape in the tape cartridge so that when said leader block is pulled into said receptacle by the engagement means, the leader block fits inside the receptacle in such a manner that the first and second sub flange circumferential edge surfaces provide a smooth tape winding surface for the length of tape in the tape cartridge.

3. A take-up reel apparatus for use with a single-reel tape cartridge in a cartridge based tape drive comprising:

a hub having a substantially cylindrical shape, and having a first end and a second end;

a first sub plate having a substantially disk shape, an inner diameter, an outer diameter, a top surface, a bottom surface and an outer circumferential surface, wherein said bottom surface of said first sub plate is connected to said first end of said hub to render said hub and said first sub plate concentric;

a second sub plate having a substantially disk shape, an inner diameter, an outer diameter, a top surface, a bottom surface and an outer circumferential surface, wherein said top surface of said second sub plate is connected to said second end of said hub to render said hub and said second sub plate concentric wherein the first and second subplates and the hub are in a spaced apart relationship forming a receptacle space, said space extending substantially from said each sub plate inner diameter to each sub plate outer diameter thereof, wherein said receptacle space is dimensioned to receive a leader block attached to one end of magnetic tape, the leader block being received in a manner that allows the magnetic tape to wind appropriately around the circumferential surfaces of both subplates;

a first main plate having a substantially disk shape, and having a top surface and a bottom surface, wherein said bottom surface of said first main plate is connected to said top surface of said first sub plate rendering said first sub plate and said first main plate concentric; and a second main plate having a substantially disk shape, and having a top surface and a bottom surface, wherein said top surface of said second main plate is connected to said bottom surface of said second sub plate, rendering said second sub plate and said second main plate concentric.

4. The take-up reel of claim 3 wherein the hub further comprises a length of take-up reel guide tape captively connected to a take-up block wherein the take-up reel guide tape and the take-up block are dimensioned to fit inside the space and said take-up block being dimensioned to receive a leader block.

* * * * *